United States Patent [19]

Krulwich

[11] 3,963,159

[45] June 15, 1976

[54] GLASS CUTTING APPARATUS

[76] Inventor: Lester S. Krulwich, 241 Central Park West, New York, N.Y. 10024

[22] Filed: July 16, 1975

[21] Appl. No.: 596,390

[52] U.S. Cl. .................................... 225/96.5; 83/6
[51] Int. Cl.² .................................... B26F 3/00
[58] Field of Search ................ 225/2, 94, 96, 96.5, 225/103, 104; 83/6

[56] References Cited
UNITED STATES PATENTS

| | | | |
|---|---|---|---|
| 2,814,163 | 11/1957 | Krulwich | 225/96 |
| 2,924,044 | 2/1960 | Basso | 225/103 |
| 3,371,833 | 3/1968 | Sutton | 225/2 |
| 3,570,734 | 3/1971 | Allen | 225/96.5 X |

*Primary Examiner*—Othell M. Simpson
*Assistant Examiner*—Fred A. Silverberg

[57] ABSTRACT

A jig in the form of two fairly rigid plates, with clips, of magnetically attractable material positioned next to each other with two of their side front edges adjacent and the rear portions of said sides cut away. The forward part of said adjacent edges are optionally bent slightly upwards. The bottom of each plate, towards the front, is attached to an extension piece by a hinge and the bottom of said extension piece contains a strip extending longitudinally behind the plates with a magnet at each end spaced so that they magneticallly attract, without contacting, the plates when the clips hold a sheet of glass and the plates are about horizontally extended. The extension piece is provided with a front section on which an elongated bar is adjustably attached, said bar having a slot to guide a glass cutting tool and extending forward over said adjacent edges of the plates. The extension piece contains resilient material under the adjacent edges, bearing up against said edges when the plates hold the sheet of glass and are horizontallly extended.

10 Claims, 6 Drawing Figures

GLASS CUTTING APPARATUS

This invention relates to improvements in apparatus for cutting sheets of glass. It provides a complete and practical instrument producing results substantially more perfect and economical than obtainable with this inventor's patent Glass Cutting Apparatus U.S. Pat. No. 2,814,163.

An important object of this invention is to provide an improved jig for holding a sheet of glass to be scored, the jig being adapted to exert selected forces automatically upon the held sheet of glass at the front of the score line and at the front sides of the score line simultaneously. These forces are adjustably calculated to sever the glass automatically after the scoring. Optionally the jig may be adjusted for severence by slight manual pressure.

Another important object of this invention is to provide a glass cutting apparatus having a jig that maintains the same degree of pressure without readjustment after continuous use.

Another object of this invention is to provide a glass cutting apparatus that is more economical to make so that it can be marketed at a moderate price.

Another object of this invention is to provide a glass cutting apparatus on which a sheet of glass may be readily inserted and cut.

Further objects and structural details of the invention will be apparent from the following description when read in conjunction with accompanying drawings forming a part of this specification, wherein.

Figure 1:
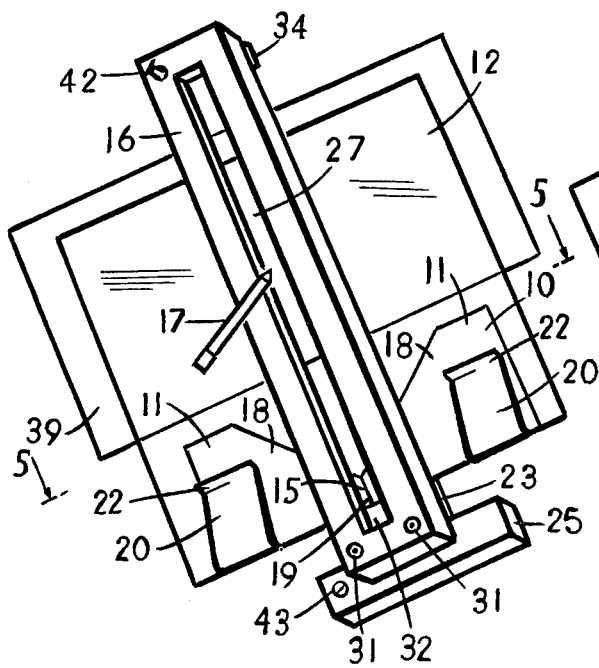
FIG. 1 is a perspective view of a preferred embodiment of a jig in accordance with my invention showing the jig in the form of two plates holding a sheet of glass under the slotted bar.
Figure 2:
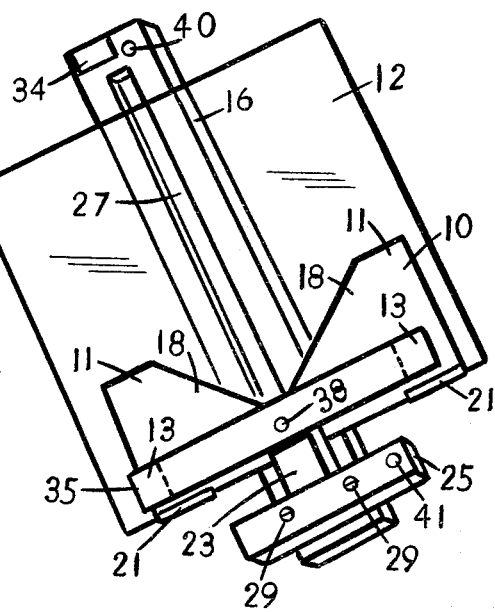
FIG. 2 is a perspective view of the invention viewed from the bottom showing the strip with magnets spaced behind the plates.

Upon reference to the drawings it will be noted that they show a glass cutting apparatus comprising a jig 10 in the form of two plates 11 of magnetically attractable material adapted to hold a sheet of glass 12, magnets 13 spaced under the plates 11 and resilient material 14 midway under the plates 11 where the plate edges 15 meet. The drawings also show an elongated mounting bar 16 for the jig 10 and the drawings show illustratively a tool 17 which may be guided by the bar 16 and used to score the glass sheet 12.

Figure 3:
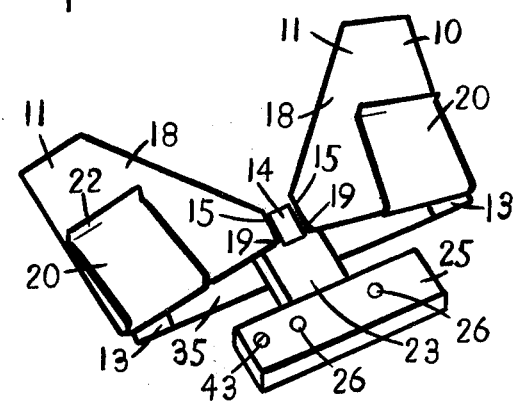
FIG. 3 is a perspective view of the jig along without the glass.
Figure 4:
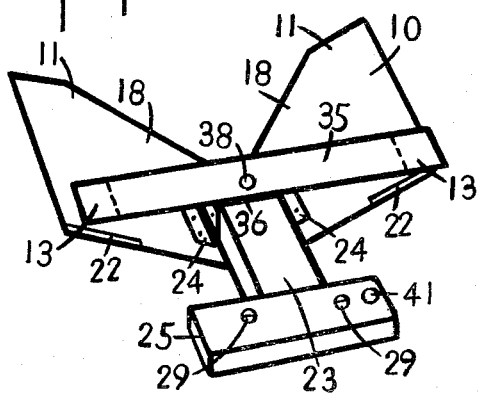
FIG. 4 is a perspective view of the jig alone viewed from the bottom.
Figure 5:
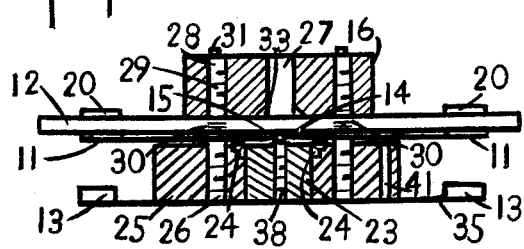
FIG. 5 is a section on line 5—5 of FIG. 1 with the direction of sight from the rear of the assembly to show the features more clearly.
Figure 6:
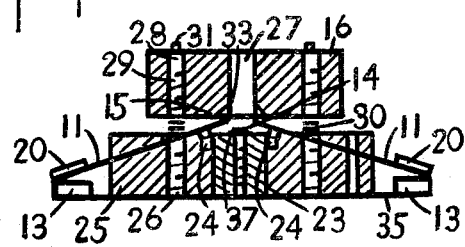
FIG. 6 is a view similar to FIG. 5 but with the sheet of glass omitted and the two plates slanting down.

The basic jig 10 is shown in FIG. 3 and other views and is in the form of two plates 11 of magnetically attractable material, preferably fairly rigid, such as sheet iron, approximately rectangular, positioned next to each other with rear central portions 18 cut away and front side edges 15 adjacent. Said rear central portions 18 are cut away up to the rear of said adjacent edges 15. Optionally and preferably said adjacent edges 15, towards the front 19, are bent slightly upwards. Each plate 11 thus extends outwardly from the front central edges 15 of the two plates 11. Each plate 11 is provided on its lateral side with a clip 20 which extends rearwardly from the front edge of said plate 11 adjacent the side, and said clips 20 respectively overlie the upper faces of said plates 11. The clips 20 may be integral with the plates 11 but are preferably of resilient material such as spring steel with the front edges bent onto the back 21 of the plates 11 and fastened by rivets or other suitable means. The rear end portions 22 of the clips 20 are bent upwardly to facilitate the insertion of a sheet of glass 12 between the clips 20 and the plates 11.

An extension piece 23 is provided, preferably relatively flat and oblong, extending forwardly midway under the adjacent edges 15 of the plates 11, and hinges 24 are fastened to the sides of the extension piece 23 and to the bottom of the plates 11 allowing said plates 11, before the glass 12 is inserted, to swing freely up and back from the central line formed by said adjacent plate edges 15. Suitable flexible material may be used instead of hinges 24. Preferably the pins of said hinges 24 are mounted slightly above the top of said extension piece 23.

A front section 25 is fastened to or integral with the extension piece 23, longitudinally horizontal, at right angles to the extension piece 23. Said front section 25 is provided with a hole 26 towards each of its longitudinal sides.

The mounting bar 16 is preferably longitudinally elongated and of generally rectangular shape and preferably has a central longitudinal slot 27 therein. Said bar 16 is provided at its front end with vertically extending through holes 28 corresponding to the holes 26 in the front section 25. A bolt 29 extends through each of the holes 26 in the front section 25 up through registering holes 28 in the bar 16. The heads of the bolts 29 are countersunk so as not to extend below the bottom surface of the front section 25. Washers 30 are mounted on the respective bolts 29 between the front section 25 and the bar 16 to accommodate the thickness of the glass sheet 12 and the bolts 29 are secured on top by nuts 31. Said nuts 31 may be capnuts with extra washers. This assembly is shown in FIG. 1 and other views.

The slot 27 in the bar 16 registers vertically with the central line formed by the adjacent plate edges 15. In the assembly the front end of the slot 27 preferably extends slightly beyond the front edges of the plates 11 allowing space 32 for the cutter 17 to go off the glass 12. Towards the front of the bar 16 above said adjacent edges 15, the bottom sides 33 of the slot 27 are partially cut away to allow free swinging of the plates 11. The bottom rear end of the bar 16 has attached to it, by suitable means, a cushion 34 or other material to elevate that end partly or approximately to the same level as the front end of the bar 16.

A fairly rigid strip 35, made for example of metal strap, is fastened by suitable means to the rear bottom of the extension piece 23 and extends longitudinally and approximately horizontally across and under each of the plates 11. The bottom of the extension piece 23, midway 36 the strip 35 is preferably cut away so as to have the bottom of the strip 35 level with the bottom of the extension piece 23. Near each end of the strip 35 a magnet 13 is affixed, by suitable means, that magnetically attracts the opposite plate 11. The magnets 13 on said strip 35 are spaced from the plates 11, approximately under the front lateral sides of the clips 20, so that said magnets' magnetic fields exert their attracting forces on the plates 11 as said plates 11 extend about horizontally outward when the clips 20 hold the sheet of glass 12. The strip 35, although fairly rigid, may be adjusted and inclined at a slight angle to the horizontal on each longitudinal side.

The top of the extension piece 23, under said adjacent edges 15, preferably towards the front, is optionally provided with resilient material 14 such as rubber, suitably affixed, which bears up against the bottom of said adjacent edges 15 when the clips 20 are holding the sheet of glass 12. Optionally said resilient material 14 may be adjustably supported on the head of a bolt 37 screw-threaded vertically through the extension piece 23 with the bottom 38 of said bolt 37 inserted above the bottom surface of the extension piece 23.

The illustrative cutter 17 is a diamond glass cutter which is especially efficient on this bar 16 and jig 10 as a glazier diamond must face a fairly exact direction. A conventional wheel cutter or differently shaped diamond cutter may also be used.

OPERATION OF THE APPARATUS

FIG. 3 and the other views show the fundamental operation of the apparatus. The sheet of glass 12 is inserted frictionally between the respective clips 20 with the front edge of the glass 12 preferably reaching the front of the adjacent edges 15 of the plates 11. The sheet of glass 12 almost straightens the plates 11 horizontally and almost abuts both plates 11 since the adjacent edges 15 are optionally bent only slightly upwards. A pad 39 of newspapers, carpeting or other material is placed under the glass 12 to the rear of the plates 11 raising the level of the glass 12 there approximately to the level of the glass 12 in the clips 20.

The glass cutter 17 is run in the bar slot 27 scoring the glass 12 and going over the adjacent edges 15. The fairly rigid plates 11 do not require readjusting after cutting. Not being of resilient metal they maintain the same degree of pressure after constant use. With the two plates 11 and the removal of the rear central portions 18 the force is desirably concentrated near the front edge of the glass 12. The device is set to cut automatically with the resilient material 14 bearing upwards and the magnets 13 pulling downwards, cooperating in tensioning the glass 12 above the adjacent edges 15.

Narrow pieces of glass are effectively cut by inserting the glass 12 in just one clip 20 with the edge to be cut only under the side walls of the bar 16. This gives a clean cut along the score line.

Where the force does not by itself sever the glass 12 after scoring, an easy downward touch on the clips 20 accomplishes this, bringing the plates 11 down to the magnets 13. The plates 11 do not have to be lifted and manually flexed back.

Holes are optionally provided near the rear longitudinal end 40 of the bar 16 and in a side 41 of the front section 25 for fastening to a board or table when the apparatus will be used frequently. A long nail 42 or screw is fastened, partly down, through said rear bar hole 40 so that the bar 16 can be raised sufficiently to insert the sheet of glass 12 and a screw 43 is attached through the front section hole 41, or other suitable means of fastening can be used.

I have described preferred embodiments of my invention but it is understood that various changes may be made in the form, details, arrangements and proportions of the various parts without departing from the scope of my invention.

What I claim is:

1. A glass cutting apparatus comprising two plates adjacent to each other and means attaching said plates to an extension piece so that each plate is allowed to swing up and back from the line formed by the adjacent plate edges, said extension piece having a front section with means mounting a bar thereon, said bar containing an elongated slot extending rearwardly from in front of said plates to substantially the opposite end of the bar, said plates being spaced from and opposing said bar and protruding beyond the sides of the bar with the adjacent edges of said plates being substantially parallel to said bar and said plates having means for releasably clamping a sheet of glass against said plates with the front end portion of said sheet of glass extending between said plates and said bar and with said bar opposing said sheet of glass along substantially the entire length of said sheet of glass, means exerting pressure under and on each plate when said sheet of glass is clamped, said pressure being insufficient to break the glass prior to scoring thereof, and means for scoring said sheet of glass with said bar slot as a guide, said means exerting pressure on said plates being then adapted to exert a severing force on said sheet of glass along the score line.

2. A glass cutting apparatus according to claim 1, said plates being of fairly rigid material, with the front portion of the central side edges movably adjacent and the portion of said sides to the rear of said adjacent edges cut away.

3. A glass cutting apparatus according to claim 2, said plates being magnetically attractable and having magnets, with fastening means, under and spaced away from said plates, positioned to have the magnets' magnetic fields exert their attracting forces on said plates when said plates clamp said sheet of glass.

4. A glass cutting apparatus according to claim 3, said extension piece provided with resilient material, with fastening means, under said adjacent plate edges which bears up against said adjacent edges when said plates clamp said sheet of glass.

5. A glass cutting apparatus according to claim 3, said adjacent edges, towards the front, being bent slightly upwards.

6. A glass cutting apparatus according to claim 1, said plates being magnetically attractable and having magnets, with fastening means, under and spaced away from said plates, positioned to have the magnets' magnetic fields exert their attracting forces on said plates when said plates clamp said sheet of glass.

7. A glass cutting apparatus according to claim 6, said extension piece provided with resilient material, with fastening means, under said adjacent plate edges which bears up against said adjacent edges when said plates clamp said sheet of glass.

8. A glass cutting apparatus according to claim 1, said extension piece provided with resilient material, with fastening means, under said adjacent plate edges which bears up against said adjacent edges when said plates clamp said sheet of glass.

9. A glass cutting apparatus according to claim 8, said adjacent edges, towards the front, being bent slightly upwards.

10. A glass cutting apparatus according to claim 1, said adjacent edges, towards the front, being bent slightly upwards.

* * * * *